United States Patent
Yano

(10) Patent No.: US 7,493,204 B2
(45) Date of Patent: Feb. 17, 2009

(54) VEHICLE ROLLOVER DETECTION METHOD AND APPARATUS

(75) Inventor: Ryuji Yano, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 805 days.

(21) Appl. No.: 10/839,254

(22) Filed: May 6, 2004

(65) Prior Publication Data

US 2004/0254710 A1 Dec. 16, 2004

(30) Foreign Application Priority Data

Jun. 12, 2003 (JP) ............................. 2003-167311

(51) Int. Cl.
*G06F 19/00* (2006.01)
*G06F 7/70* (2006.01)
*G06G 7/00* (2006.01)

(52) U.S. Cl. ..................... 701/70; 701/45; 701/72; 340/429; 180/282; 180/271

(58) Field of Classification Search .............. 701/45, 701/70, 72; 340/429, 739, 440; 280/735; 180/282, 271
See application file for complete search history.

(56) References Cited

U.S. PATENT DOCUMENTS

| 6,216,079 | B1 * | 4/2001 | Matsuda ........................ 701/70 |
| 6,594,570 | B2 * | 7/2003 | Nagao et al. .................... 701/45 |
| 6,600,414 | B2 * | 7/2003 | Foo et al. ....................... 340/440 |
| 7,162,343 | B2 * | 1/2007 | Subbian et al. ................. 701/45 |
| 7,236,864 | B2 * | 6/2007 | Ogata et al. .................... 701/38 |
| 2002/0075140 | A1 * | 6/2002 | Yeh et al. ...................... 340/438 |
| 2002/0075142 | A1 * | 6/2002 | Foo et al. ....................... 340/440 |
| 2002/0075143 | A1 * | 6/2002 | Foo et al. ....................... 340/440 |
| 2002/0087235 | A1 * | 7/2002 | Aga et al. ........................ 701/1 |
| 2002/0099486 | A1 * | 7/2002 | Nagao et al. .................... 701/45 |
| 2002/0152012 | A1 * | 10/2002 | Watson et al. .................. 701/45 |
| 2002/0173882 | A1 * | 11/2002 | Tobaru et al. .................... 701/1 |
| 2003/0182042 | A1 * | 9/2003 | Watson et al. .................. 701/45 |
| 2004/0026151 | A1 * | 2/2004 | Ogata et al. .................... 180/282 |
| 2004/0167696 | A1 * | 8/2004 | Ogata et al. .................... 701/45 |
| 2004/0167701 | A1 * | 8/2004 | Mattson et al. ................. 701/71 |
| 2004/0176889 | A1 * | 9/2004 | Capito .......................... 701/37 |
| 2004/0176893 | A1 * | 9/2004 | Ogata et al. .................... 701/45 |
| 2005/0004730 | A1 * | 1/2005 | Suzuki et al. ................... 701/38 |
| 2005/0159864 | A1 * | 7/2005 | Ogata et al. .................... 701/38 |
| 2006/0129298 | A1 * | 6/2006 | Takeda ......................... 701/70 |

FOREIGN PATENT DOCUMENTS

| JP | 2001-260786 | 9/2001 |
| JP | P2001-260786 A | 9/2001 |
| WO | WO 03/010034 | 2/2003 |

* cited by examiner

*Primary Examiner*—Khoi Tran
*Assistant Examiner*—Jorge O Peche
(74) *Attorney, Agent, or Firm*—McDermott Will & Emery

(57) ABSTRACT

There is provided a method for detecting the possibility of rollover of a vehicle, including the steps of: detecting an actual roll angular velocity of the vehicle; obtaining an actual roll angle of the vehicle; determining an actual lateral acceleration of the vehicle; providing a two-dimensional map correlating values of the roll angular velocity with values of the roll angle to define a rollover judgment threshold; changing the threshold based on the actual roll angle and the actual lateral acceleration; forming a plot of the actual roll angular velocity versus the actual roll angle on the two-dimensional map; and judging that there is a possibility that the vehicle rolls over when the plot exceeds the threshold.

8 Claims, 5 Drawing Sheets

US 7,493,204 B2

VEHICLE ROLLOVER DETECTION METHOD AND APPARATUS

BACKGROUND OF THE INVENTION

The present invention relates to a method and apparatus for detecting the possibility of rollover of a vehicle based on a roll angular velocity and a roll angle of the vehicle.

Japanese Laid-Open Patent Publication No. 2001-260786 proposes vehicle rollover detection technique, in which it is judged that there is a possibility that a vehicle rolls over when the plot of an actual roll angular velocity and an actual roll angle of the vehicle on a two-dimensional map crosses a threshold line. The threshold line is set on the map with reference to normal usage conditions of the vehicle.

SUMMARY OF THE INVENTION

The actual usage conditions of the vehicle are not limited to the normal vehicle usage conditions, and vary depending on such arbitrary parameters as the number of occupants in the vehicle and the weight and position of a load on the vehicle. The vehicle characteristics including the height of the center of gravity of the vehicle become changed in accordance with the actual vehicle usage conditions. The vehicle characteristics may also be changed due to e.g. a decrease in elasticity (a permanent set in fatigue) of vehicle suspensions with years of use.

In the above proposed vehicle rollover detection technique, however, the rollover judgment threshold line is not adjusted in response to these changes in the vehicle characteristics, thereby occasionally failing to provide an optimum vehicle rollover judgment.

It is therefore an object of the present invention to provide a vehicle rollover detection method and apparatus capable of making an optimum judgment about whether there is a possibility that a vehicle rolls over based on a roll angular velocity and a roll angle of the vehicle, even when the characteristics of the vehicle have been changed in accordance with the actual vehicle usage conditions etc.

According to a first aspect of the invention, there is provided a method for detecting the possibility of rollover of a vehicle, comprising: detecting an actual roll angular velocity of the vehicle; obtaining an actual roll angle of the vehicle; determining an actual lateral acceleration of the vehicle; providing a two-dimensional map correlating values of the roll angular velocity with values of the roll angle to define a rollover judgment threshold; changing the threshold based on the actual roll angle and the actual lateral acceleration; forming a plot of the actual roll angular velocity versus the actual roll angle on the two-dimensional map; and judging that there is a possibility that the vehicle rolls over when the plot exceeds the threshold.

According to a second aspect of the invention, there is provided an apparatus for detecting the possibility of rollover of a vehicle, comprising: means for detecting an actual roll angular velocity of the vehicle; means for obtaining an actual roll angle of the vehicle; means for determining an actual lateral acceleration of the vehicle; means for providing a two-dimensional map correlating values of the roll angular velocity with values of the roll angle to define a rollover judgment threshold; means for changing the threshold based on the actual roll angle and the actual lateral acceleration; means for forming a plot of the actual roll angular velocity versus the actual roll angle on the two-dimensional map; and means for judging that there is a possibility that the vehicle rolls over when the plot exceeds the threshold.

According to a third aspect of the invention, there is provided an apparatus for detecting the possibility of rollover of a vehicle, comprising: a rate sensor to detect an actual roll angular velocity of the vehicle; and a controller connected to the rate sensor to read the actual roll angular velocity and storing therein a roll angular velocity versus roll angle map, the roll angular velocity versus roll angle map having threshold lines in first and third quadrants of the map to define rollover ranges on farther sides of the threshold lines from an origin of the map, the controller being configured to: calculate an actual roll angle of the vehicle from the actual roll angular velocity; determine an actual lateral acceleration of the vehicle; calculate a threshold change factor from the actual roll angle and the actual lateral acceleration; change the threshold lines with reference to the threshold change factor so as to adjust the rollover ranges; form a plot of the actual roll angular velocity versus the actual roll angle on the map; and judge the possibility of rollover of the vehicle when the plot falls within either of the rollover ranges.

The other objects and features of the invention will also become understood from the following description.

DESCRIPTION OF THE EMBODIMENTS

The present invention will be described below with reference to the drawings.

There is provided vehicle rollover detection apparatus 1 for detecting the possibility of rollover of vehicle 61 in one exemplary embodiment of the present invention.

Figure 1:
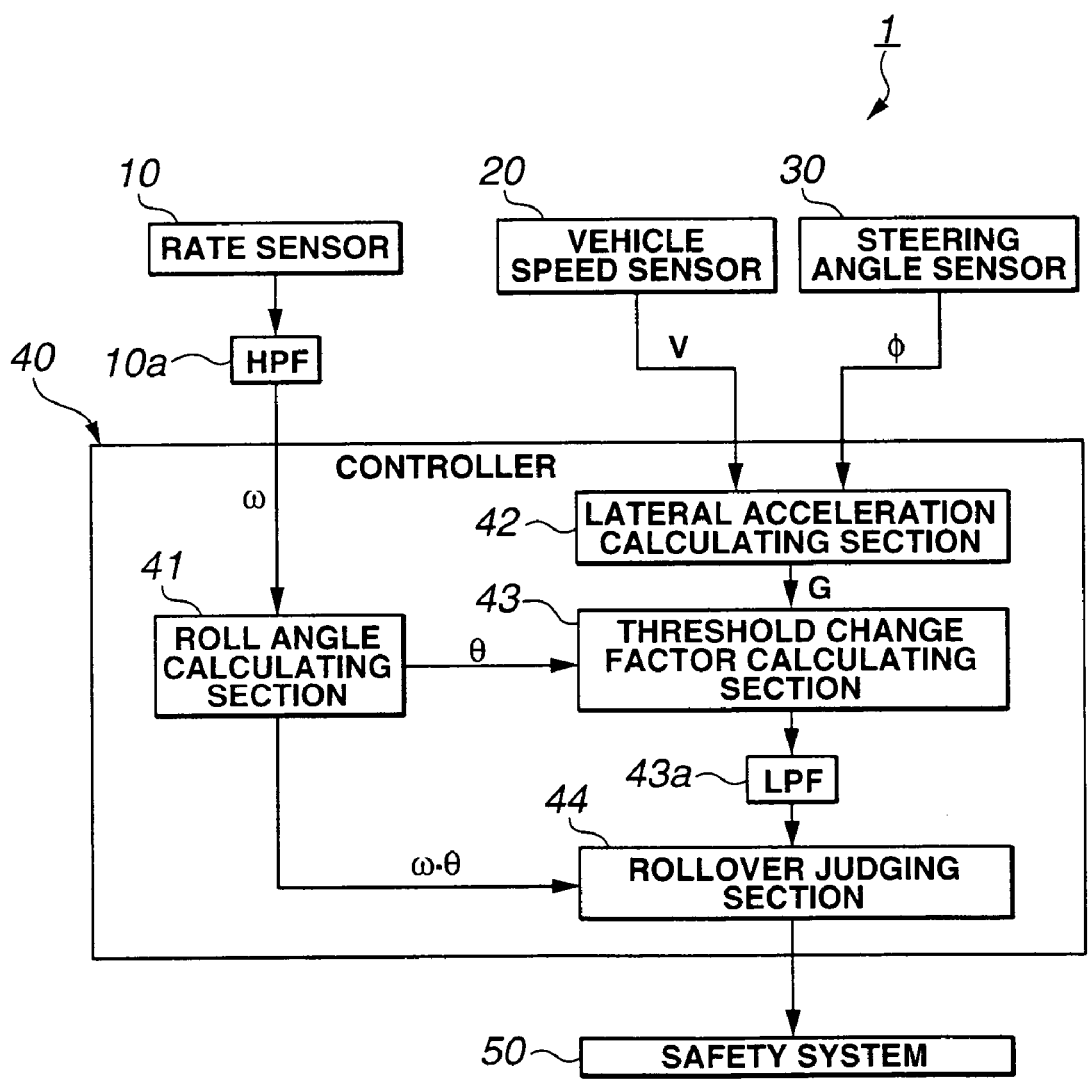
FIG. 1 is a schematic view of a vehicle rollover detection apparatus according to one embodiment of the present invention.

As shown in FIG. 1, vehicle rollover detection apparatus 1 includes rate sensor 10 to detect an angular velocity $\omega$ of rotation of vehicle 61 about a vehicle forward/reverse traveling direction (hereinafter referred to as a "roll angular velocity"), vehicle speed sensor 20 to detect a traveling speed V of vehicle 61 (hereinafter just referred to as a "vehicle speed"), steering angle sensor 30 to detect a steering angle $\phi$ of vehicle 61 through a steering wheel (not shown), controller 40 to judge whether or not there is a possibility that vehicle 61 rolls over based on the roll angular velocity $\omega$ and roll angle $\theta$ of vehicle 61 and to control safety system 50 upon the vehicle rollover judgment. Rate sensor 10, vehicle speed sensor 20 and steering angle sensor 30 are connected to controller 40 so that controller 40 receives input about the roll angular velocity $\omega$, vehicle speed V and steering angle $\phi$ via rate sensor 10, vehicle speed sensor 20 and steering angle sensor 30, respectively. Safety system 50 has a curtain air bag with an inflator and/or a seat belt with a pretensioner connected with controller 40, such that safety system 50 is operated under the control of an actuation signal from controller 40.

Figure 2:
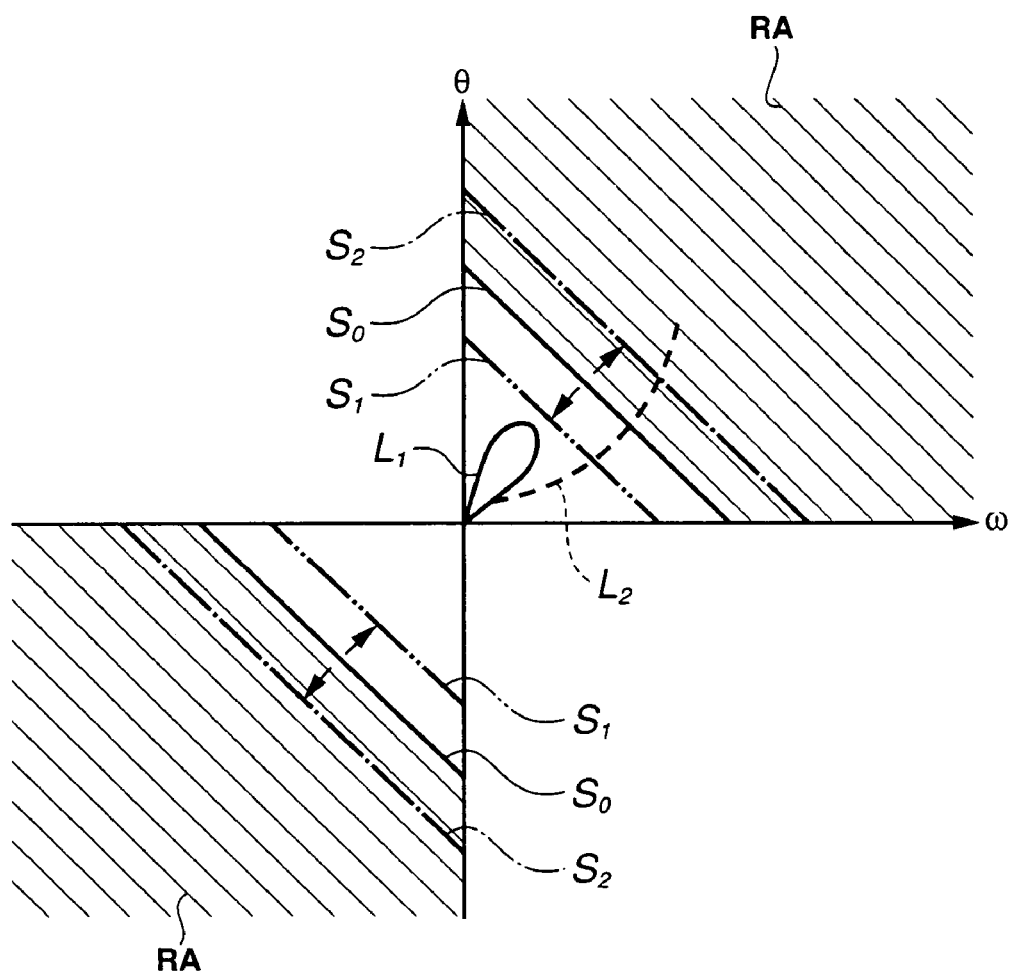
FIG. 2 is a two-dimensional map used for judging the possibility of rollover of a vehicle according to one embodiment of the present invention.

Controller 40 is generally comprised of a CPU, a ROM and a RAM, and stores therein a two-dimensional map correlating values of the roll angular velocity ω with values of the roll angle θ to define threshold S for judging the possibility of rollover of vehicle 61. The rollover judgment threshold S is initially represented by two reference threshold lines $S_0$ in the first and third quadrants of the roll angular velocity versus roll angle map so as to form two rollover ranges RA on the sides of the threshold lines $S_0$ farther from an origin of the map in the first and third quadrants as shown in FIG. 2. The reference threshold lines $S_0$ are set on the basis of the characteristics of vehicle 61 under normal usage conditions in terms of the number of occupants 62, the weight and position of load 63 and the like. In the normal usage conditions where the reference threshold lines $S_0$ are applied, vehicle 61 undergoes a given level of lateral acceleration G and rolls at a roll angle $θ_0$ (hereinafter referred to as a "reference roll angle") while turning around at constant steady speed V, as shown in FIG. 4A, and the center of gravity gv of vehicle 61 is positioned at a height $h_0$ (hereinafter referred to a "reference height") relative to the ground.

As shown in FIG. 1, controller 40 includes roll angle calculating section 41, lateral acceleration calculating section 42, threshold change factor calculating section 43 and rollover judging section 44.

Roll angle calculating section 41 is connected with rate sensor 10 to read the actual roll angular velocity ω from rate sensor 10, and is programmed to calculate the actual roll angle θ from the actual roll angular velocity ω. The actual roll angle θ is obtained by integrating the actual roll angular velocity ω. Further, roll angle calculating section 41 is connected with threshold change factor calculating section 43 to output the actual roll angle θ to threshold change factor calculating section 43 and, at the same time, is connected with rollover judging section 44 to output the actual roll angle θ as well as the actual roll angular velocity ω to rollover judging section 44. In order to suppress the effect of output fluctuations in rate sensor 10, high-pass filter (HPC) 10a is provided between rate sensor 10 and roll angle calculating section 41.

Lateral acceleration calculating section 42 is connected with vehicle speed sensor 20 and steering angle sensor 30 to read the vehicle speed V and steering angle φ from vehicle speed sensor 20 and steering angle sensor 30, respectively, and is programmed to calculate the lateral acceleration G actually acting on vehicle 61 from the vehicle speed V and steering angle φ. In the present embodiment, the lateral acceleration G is determined by estimating a lateral vehicle speed $V_X$ (i.e., a component of vehicle speed V in a direction laterally perpendicular to the vehicle forward/reverse traveling direction) from the vehicle speed V and steering angle φ and differentiating the lateral vehicle speed $V_X$. Alternatively, lateral acceleration calculating section 42 may be programmed to calculate the actual lateral acceleration G only when the steering angle φ is equal to or larger than a given degree, so as to avoid a calculation error that can occur in straight-ahead traveling where both of the lateral acceleration and lateral inclination angle of vehicle 61 are small and to thereby improve the accuracy of the vehicle rollover judgment. In this way, the lateral acceleration G is determined based on the outputs from vehicle speed sensor 20 and steering angle sensor 30 that are provided for other intended uses in the present embodiment. It is thus possible to provide vehicle rollover detection apparatus 1 at a lower cost.

Threshold change factor calculating section 43 is connected with roll angle calculating section 41 and lateral acceleration calculating section 42 to read the actual roll angle value θ and lateral acceleration G from roll angle calculating section 41 and lateral acceleration calculating section 42, respectively, and is programmed to calculate a threshold change factor α from the actual roll angle θ and lateral acceleration G in order to change the rollover judgment threshold S and thereby adjust the rollover ranges RA in accordance the vehicle characteristics conforming to the actual usage conditions of vehicle 61. The threshold change factor α is calculated by dividing the roll angle θ by the lateral acceleration G (α=θ/G) in the present embodiment, and is initially set to a reference value $α_0$ provided for the reference threshold lines $S_0$.

Figure 3:
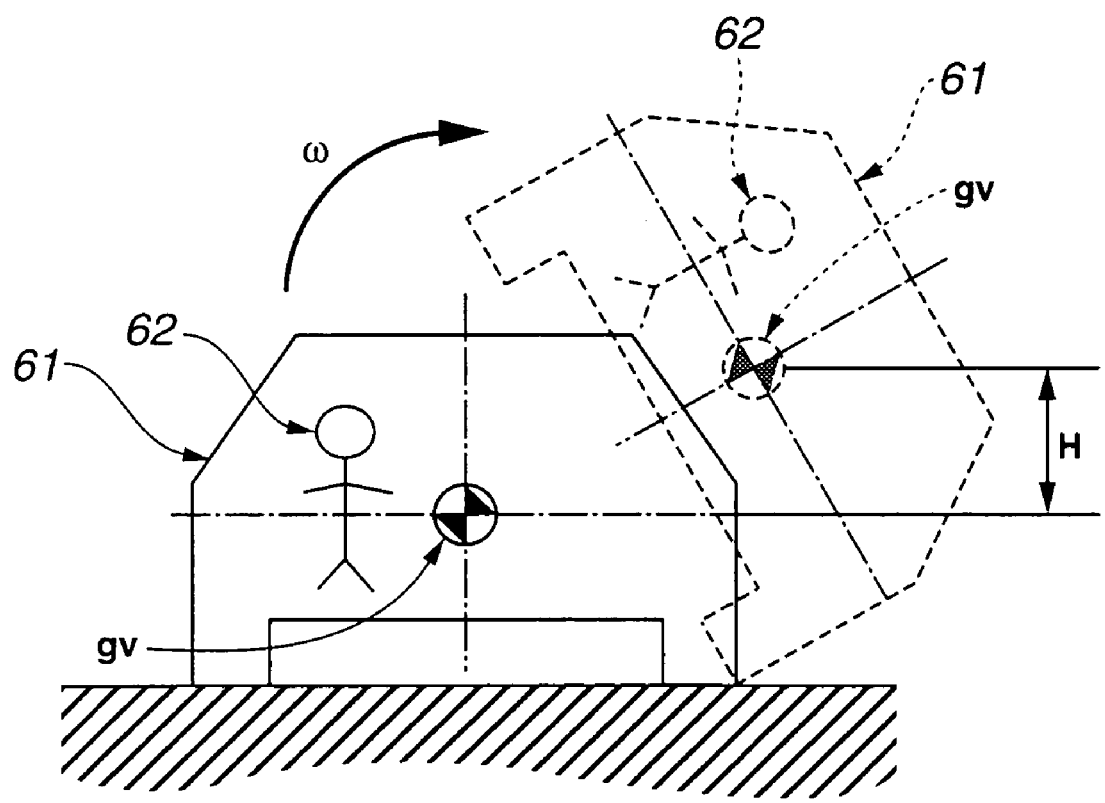
FIG. 3 is a schematic view for explaining how the vehicle rolls over.

Herein, the occurrence of rollover of vehicle 61 will be now explained below. The rollover of vehicle 61 occurs at the time the rolling energy (rotational kinetic energy) of vehicle 61 becomes larger than the potential energy of vehicle 61 corresponding to a difference H between the initial height and the maximum possible height of the center of gravity gv of vehicle 61 as shown in FIG. 3. In other words, the rollover of vehicle 61 occurs at the time the following equation is satisfied:

$$\frac{1}{2}mω^2 > mgH$$

where m is the mass of vehicle 61, ω is the roll angular velocity of vehicle 61 and g is the gravitational acceleration.

Figure 4B:
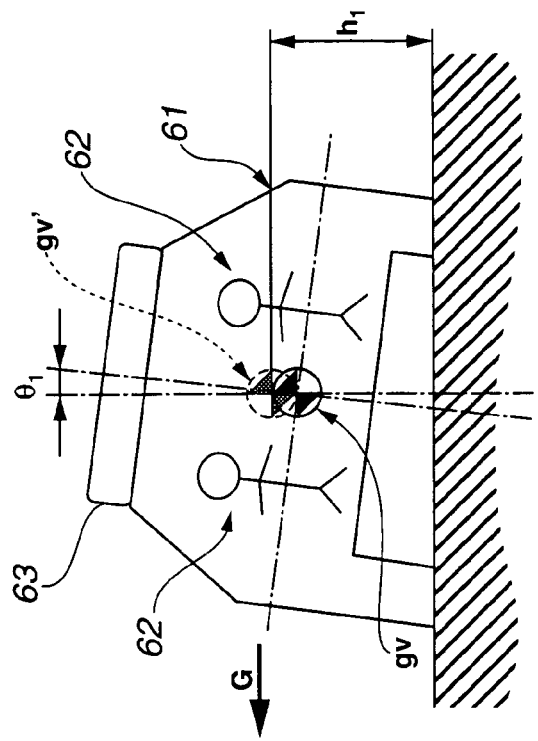
FIGS. 4A and 4B are schematic views for explaining how vehicle roll behavior becomes changed in accordance with vehicle usage conditions.
Figure 4A:
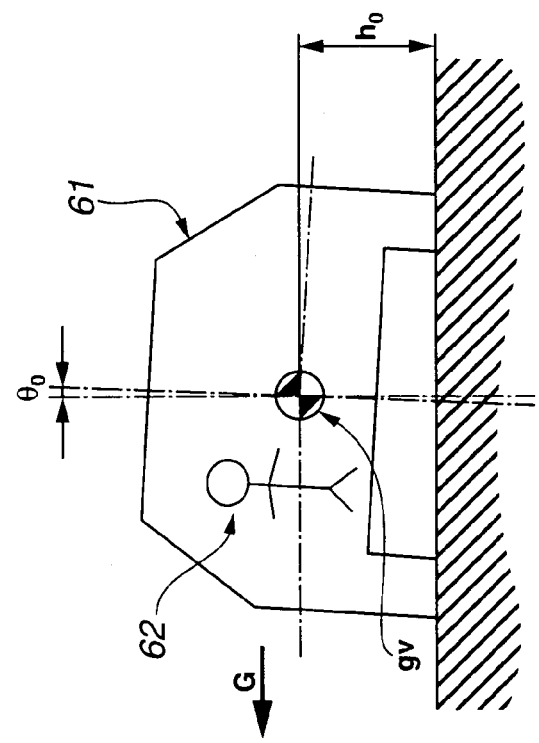

When there are increases in the number of occupants 62 and/or the weight of load 63, as shown in FIG. 4B, with reference to the above normal usage conditions of vehicle 61 (shown in FIG. 4A), the center of gravity gv' of vehicle 61 becomes positioned at a height $h_1$ greater than the reference height $h_0$ ($h_0<h_1$) relative to the ground. The potential energy margin mgH of vehicle 61 decreases with increase in the height of the center of gravity of vehicle 61, thereby increasing the possibility of rollover of vehicle 61. In such actual usage conditions, vehicle 61 rolls at a roll angle $θ_1$ larger than the reference roll angle $θ_0$ ($θ_0<θ_1$) even when undergoing the same level of lateral acceleration G as in the normal usage conditions.

Threshold change factor calculating section 43 is thus programmed to decide that the height of the center of gravity of vehicle 61 has increased in accordance with the actual vehicle usage conditions upon detection of the roll angle $θ_1$ and lateral acceleration G, and then, give as the threshold change factor α a first value $α_1$ (=$θ_1$/G) larger than the reference value $α_0$ ($α_0<α_1$), so as to change the rollover judgment threshold S from the threshold lines $S_0$ to first threshold lines $S_1$ located closer to the origin of the map than the reference threshold lines $S_0$ as shown in FIG. 2.

Similarly, vehicle 61 rolls at a larger roll angle θ even under the same lateral acceleration G if the suspensions (not shown) of vehicle 61 have been deteriorated. In such a case, threshold change factor calculating section 43 also calculates the threshold change factor α so as to bring both of the threshold lines $S_0$ closer to the origin of the map.

On the other hand, when there are decreases in the number of occupants 62 and/or the weight of load 63 (although not shown in the drawings), the center of gravity gv' of vehicle 61 becomes positioned at a height $h_2$ less than the reference height $h_0$ ($h_0>h_2$) relative to the ground. The potential energy margin mgH of vehicle 61 increases with decrease in the height of the center of gravity of vehicle 61, thereby reducing the possibility of rollover of vehicle 61. In such actual usage conditions, vehicle 61 rolls at a roll angle $θ_2$ smaller than the reference roll angle $\theta_0(\theta^0 > \theta_2)$ even when undergoing the same level of lateral acceleration G as in the normal usage conditions.

Threshold change factor calculating section 43 is thus programmed to decide, upon detection of the roll angle $\theta_2$ and lateral acceleration G, that the height of the center of gravity of vehicle 61 has decreased in accordance with the actual vehicle usage conditions, and then, give as the threshold change factor $\alpha$ a second value $\alpha_2(=\theta_2/G)$ smaller than the reference value $\alpha_0(\alpha_0 < \alpha_2)$, so as to change the threshold lines $S_0$ to second threshold lines $S_2$ located farther from the origin of the map than the reference threshold lines $S_0$ as shown in FIG. 2.

Threshold change factor calculating section 43 is also connected with rollover judging section 44 to output the threshold change factor $\alpha$ to rollover judging section 44. In order to absorb dynamic errors, low-pass filter (LPC) 43a having a large time constant is provided between lateral acceleration calculating section 42 and threshold change factor calculating section 43.

It is noted that the process of calculating the threshold change factor $\alpha$ is not limited to the above. The threshold change factor $\alpha$ may alternatively be determined using a look-up table or a high-order approximate function in view of the nonlinearity of the characteristics of vehicle 61.

Rollover judging section 44 is connected with threshold change factor 43 to read the threshold change factor $\alpha$ from threshold change factor calculating section 43, and is programmed to change the rollover judgment threshold S based on the threshold change factor $\alpha$. More specifically, the rollover judgment threshold S is changed from the reference threshold lines $S_0$ to the first threshold lines $S_1$ so as to expand the rollover range RA when the first value $\alpha_1$ larger than the reference value $\alpha_0$ is given as threshold change factor $\alpha$. This makes it possible to increase the sensitivity of vehicle rollover detection apparatus 1. When the second value $\alpha_2$ smaller than the reference value $\alpha_0$ is given as the threshold change factor $\alpha$, the rollover judgment threshold S is changed from the reference threshold lines $S_0$ to the second threshold lines $S_2$ so as to narrow the rollover range RA. This makes it possible to decrease the sensitivity of vehicle rollover detection apparatus 1. The amount of change of the rollover judgment threshold S (i.e. the amount of difference between the reference threshold lines $S_0$ and the first threshold lines $S_1$ or second threshold lines $S_2$) is generally preset using the threshold change factor $\alpha$ as a parameter during the stage of development of vehicle 61.

Also, rollover judging section 44 is connected with roll angle calculating section 41 to read the actual roll angular velocity $\omega$ and roll angle $\theta$, and is programmed to form a plot of the actual roll angular velocity $\omega$ versus the actual roll angle $\theta$ on the map and determines whether the formed plot exceeds the rollover judgment threshold S and falls into the rollover range RA of the map. For example, rollover judging section 44 judges that there is no possibility that vehicle 61 rolls over when the plot of the roll angular velocity $\omega$ versus the roll angle $\theta$ is formed as indicated by a curve $L_1$ to be located outside the rollover range RA as shown in FIG. 2. When the plot of the roll angular velocity $\omega$ versus the roll angle $\theta$ is formed as indicated by a curve $L_2$ to fall into the rollover range RA as shown in FIG. 2, rollover judging section 44 judges that there is a possibility that vehicle 61 rolls over.

Upon judging the possibility of rollover of vehicle 61, rollover judging section 41 is programmed to generate the actuation signal to actuate safety system 50 in order to protect occupant or occupants 62 in preparation of a rollover accident.

Figure 5:
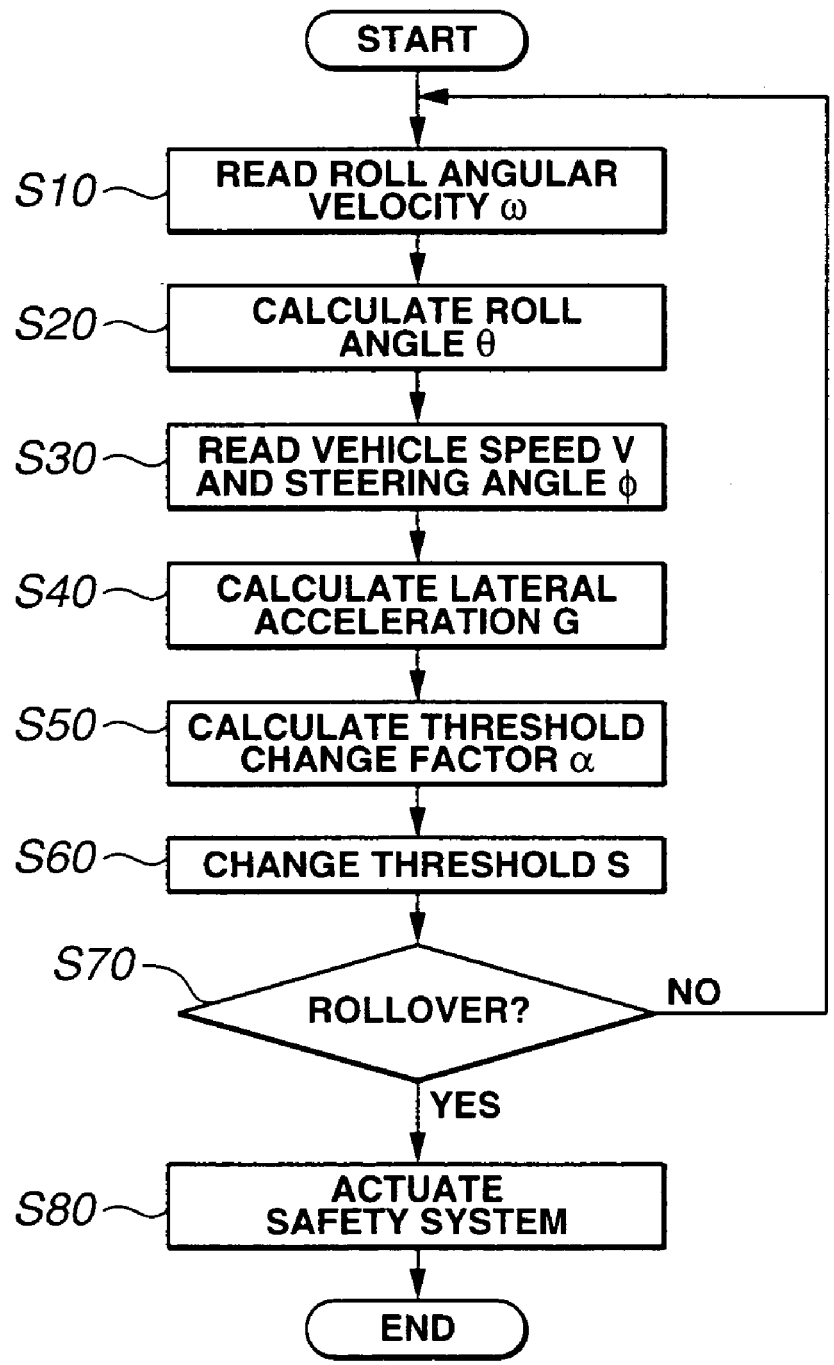
FIG. 5 is a flowchart for detecting the possibility of rollover of the vehicle according to one embodiment of the present invention.

The operations of vehicle rollover detection apparatus 1 proceed in the following steps as shown in FIG. 5.

In step S10, roll angle calculating section 41 receives input about the actual roll angular velocity $\omega$ of vehicle 61 via rate sensor 10.

In step S20, roll angle calculating section 41 calculates the actual roll angle $\theta$ by integrating the actual roll angular velocity $\omega$.

In step S30, lateral acceleration calculating section 42 receives input about the vehicle speed V and steering angle $\phi$ via vehicle speed sensor 20 and steering angle sensor 30, respectively.

In step S40, lateral acceleration calculating section 42 calculates the actual lateral acceleration G by estimating the lateral vehicle speed $V_X$ from the vehicle speed V and steering angle $\phi$ and then differentiating the lateral vehicle speed $V_X$.

In step S50, threshold change factor calculating section 43 retrieves the actual roll angle $\theta$ and lateral acceleration G from roll angle calculating section 41 and lateral acceleration calculating section 42, respectively, and calculates the threshold change factor $\alpha$ from the actual roll angle $\theta$ and lateral acceleration G.

In step S60, rollover judging section 44 retrieves the threshold change factor $\alpha$ from threshold change factor calculating section 43, compares the threshold change factor $\alpha$ with the reference value $\alpha_0$, and changes the rollover judgment threshold S based on the comparison result. As already explained, the rollover judgment threshold S is changed from the reference threshold lines $S_0$ to the first threshold lines $S_1$ to be located closer to the origin of the map and thereby expand the rollover ranges RA for higher rollover detection sensitivity, when the threshold change factor $\alpha$ is equals to the first value $\alpha_1$ larger than the reference value $\alpha_0$. When the threshold change factor $\alpha$ is equal to the second value $\alpha_2$ smaller than the reference value $\alpha_0$, the rollover judgment threshold S is changed from the reference threshold lines $S_0$ to the second threshold line $S_2$ to be located farther to the origin of the map and thereby narrow the rollover ranges RA for lower rollover detection sensitivity. If the threshold change factor $\alpha$ is equal to the reference value $\alpha_0$, the threshold S is held at the reference threshold lines $S_0$.

In step S70, rollover judging section 44 plots the actual roll angular velocity $\omega$ versus the actual roll angle $\theta$ on the map, and then, determines whether the plot of the roll angular velocity $\omega$ versus the roll angle $\theta$ falls within either of the rollover ranges RA of the map.

When the plot of the roll angular velocity $\omega$ versus the roll angle $\theta$ falls within the rollover range RA (YES in step S70), rollover judging section 44 judges that there is a possibility that vehicle 61 rolls over, and then, outputs the actuation signal to actuate safety system 50 in step S80.

When the plot of the roll angular velocity $\omega$ versus the roll angle $\theta$ does not fall within the rollover range RA (NO in step S70), rollover judging section 44 judges that there is no possibility that vehicle 61 rolls over. Then, vehicle rollover detection apparatus 1 repeats steps S10 to S70 in order to continuously monitor the rollover of vehicle 61.

As described above, vehicle rollover detection apparatus 1 is structured to adjust the criterion of judging the possibility of rollover of vehicle 61 appropriately based on the roll angle $\theta$ and lateral acceleration G so as to increase and decrease the sensitivity of rollover detection apparatus 1 when the vehicle characteristics have been changed in accordance with the actual usage conditions of vehicle 61 in terms of the occupant number, the load weight and position and the like and the deterioration in elasticity of the vehicle suspensions etc. Vehicle rollover detection apparatus 1 thus becomes able to make an optimum vehicle rollover judgment on every occasion.

The entire contents of Japanese Patent Application No. 2003-167311 (filed on Jun. 12, 2003) are herein incorporated by reference.

Although the present invention has been described with reference to specific embodiments of the invention, the invention is not limited to the above-described embodiments. Various modification and variation of the embodiments described above will occur to those skilled in the art in light of the above teaching. For example, it is alternatively possible to provide a lateral acceleration sensor in vehicle rollover detection apparatus 1 so as to determine the lateral acceleration G by actual measurement without any arithmetical operation although the lateral acceleration G is calculated from the vehicle speed V and steering angle φ in the above embodiment. It is also alternatively possible to provide an absolute tilt angle sensor in vehicle rollover detection apparatus 1 so as to determine the roll angle θ by actual measurement although the roll angle θ is calculated from the roll angular velocity φ in the present embodiment. The scope of the invention is defined with reference to the following claims.

What is claimed is:

1. A method for detecting the possibility of rollover of a vehicle, comprising:
   detecting an actual roll angular velocity of the vehicle;
   obtaining an actual roll angle of the vehicle;
   determining an actual lateral acceleration of the vehicle;
   providing a two-dimensional map correlating values of the roll angular velocity with values of the roll angle to define a rollover judgment threshold;
   calculating a threshold change factor by dividing the actual roll angle by the actual lateral acceleration;
   changing the rollover judgment threshold by the threshold change factor;
   forming a plot of the actual roll angular velocity versus the actual roll angle on the two-dimensional map; and
   judging that there is a possibility that the vehicle rolls over when the plot exceeds the rollover judgment threshold, wherein
   said changing includes bringing the rollover judgment threshold closer to an origin of the two-dimensional map when the threshold change factor is larger than a reference value and bringing the rollover judgment threshold farther from the origin of the two-dimensional map when the threshold change factor is smaller than the reference value.

2. A method according to claim 1, wherein the threshold is defined by two threshold lines in first and third quadrants of the two-dimensional map and is changed in such a manner that both of the threshold lines are brought closer to or farther from the origin of the two-dimensional map.

3. A method according to claim 1, wherein said determining includes:
   detecting a traveling speed of the vehicle;
   detecting a steering angle of the vehicle; and
   calculating the lateral acceleration from the vehicle traveling speed and steering angle.

4. An apparatus for detecting the possibility of rollover of a vehicle, comprising:
   means for detecting an actual roll angular velocity of the vehicle;
   means for obtaining an actual roll angle of the vehicle;
   means for determining an actual lateral acceleration of the vehicle;
   means for providing a two-dimensional map correlating values of the roll angular velocity with values of the roll angle to define a rollover judgment threshold;
   means for calculating a threshold change factor by dividing the actual roll angle by the actual lateral acceleration;
   means for changing the rollover judgment threshold by the threshold change factor;
   means for forming a plot of the actual roll angular velocity versus the actual roll angle on the two-dimensional map; and
   means for judging that there is a possibility that the vehicle rolls over when the plot exceeds the rollover judgment threshold, wherein
   said means for changing brings the rollover judgment threshold closer to an origin of the two-dimensional map when the threshold change factor is larger than a reference value and brings the rollover judgment threshold farther from the origin of the two-dimensional map when the threshold change factor is smaller than the reference value.

5. An apparatus according to claim 4, further comprising:
   means for detecting a traveling speed of the vehicle; and
   means for detecting a steering angle of the vehicle,
   wherein said determining means determines the lateral acceleration from the vehicle traveling speed and steering angle.

6. An apparatus for detecting the possibility of rollover of a vehicle, comprising:
   a rate sensor to detect an actual roll angular velocity of the vehicle; and a
   controller connected to the rate sensor to read the actual roll angular velocity and storing therein a roll angular velocity versus roll angle map, the roll angular velocity versus roll angle map having a rollover judgment threshold lines in first and third quadrants of the map to define rollover ranges on farther sides of the rollover judgment threshold lines from an origin of the map, the controller being configured to:
   calculate an actual roll angle of the vehicle from the actual roll angular velocity;
   determine an actual lateral acceleration of the vehicle;
   calculate a threshold change factor from the actual roll angle and the actual lateral acceleration;
   bring both of the rollover judgment threshold lines closer to the origin of the map so as to enlarge the rollover ranges when the threshold change factor is larger than a reference value and to bring both of the rollover judgment threshold lines farther from the origin of the map so as to narrow the rollover ranges when the threshold change factor is smaller than the reference value;
   form a plot of the actual roll angular velocity versus the actual roll angle on the map; and
   judge the possibility of rollover of the vehicle when the plot falls within either of the rollover ranges.

7. An apparatus according to claim 6, further comprising:
   a vehicle speed sensor to detect a traveling speed of the vehicle; and
   a steering angle sensor to detect a steering angle of the vehicle,
   wherein the controller is connected to the vehicle speed sensor and the steering angle sensor to read the vehicle traveling speed and the steering angle, respectively, and is configured to calculate the lateral acceleration from the vehicle traveling speed and the steering angle.

8. An apparatus according to claim 6, wherein the threshold change factor is calculated by dividing the actual roll angle by the lateral acceleration.

* * * * *